(12) United States Patent
Park (10) Patent No.: US 12,533,264 B2
(45) Date of Patent: Jan. 27, 2026

(54) NEGATIVE POISSON'S RATIO MATERIALS FOR EAR PLUGS AND MOUTH GUARDS

(71) Applicant: Joon Bu Park, Las Vegas, NV (US)

(72) Inventor: Joon Bu Park, Las Vegas, NV (US)

( * ) Notice: Subject to any disclaimer, the term of this patent is extended or adjusted under 35 U.S.C. 154(b) by 804 days.

(21) Appl. No.: 17/331,135

(22) Filed: May 26, 2021

(65) Prior Publication Data

US 2022/0378619 A1 Dec. 1, 2022

(51) Int. Cl.
*A61F 11/08* (2006.01)
*A47L 23/26* (2006.01)
*A61F 11/14* (2006.01)
*A63B 71/08* (2006.01)
*B29C 43/00* (2006.01)
(Continued)

(52) U.S. Cl.
CPC ............ *A61F 11/08* (2013.01); *A47L 23/266* (2013.01); *A61F 11/14* (2013.01); *A63B 71/085* (2013.01); *B29C 43/003* (2013.01); *B33Y 70/00* (2014.12); *B33Y 80/00* (2014.12); *C08L 21/00* (2013.01); *A61F 11/085* (2022.01); *B29K 2021/003* (2013.01); *B29K 2105/04* (2013.01); *B33Y 10/00* (2014.12); *C08L 2201/00* (2013.01); *C08L 2203/02* (2013.01)

(58) Field of Classification Search
CPC .. B32B 5/00; B32B 5/18; B33Y 80/00; B33Y 70/00; B33Y 10/00; A61F 11/00; A61F 11/008; A61F 11/06; A61F 11/08; A61F 11/12; A61F 11/14; A61F 11/085; A61F 2011/085; A47L 23/266; A63B 71/085; B29C 43/003; C08L 21/00; C08L 2201/00; C08L 2203/02; B29K 2021/003; B29K 2105/04; A61B 17/00

USPC ........ 128/864, 867; D24/106; 181/130, 135; D29/108, 112
See application file for complete search history.

(56) References Cited

U.S. PATENT DOCUMENTS 3,862,912 A * 1/1975 Berndt .................... C08L 61/06
521/88
2018/0174565 A1* 6/2018 Martino González .... B32B 3/04

FOREIGN PATENT DOCUMENTS

JP         2009537359 A  * 10/2009
WO    WO-2007135447 A1 * 11/2007 ................ C08J 5/04
(Continued)

OTHER PUBLICATIONS

Lakes.pdf: Roderic Lakes, "Foam Structures With a Negative Poisson's Ratio", Science, vol. 235, pp. 1038-1040, 1987 (Year: 1987).*

(Continued)

*Primary Examiner* — Caitlin A Carreiro
(74) *Attorney, Agent, or Firm* — Fish & Richardson P.C.

(57) ABSTRACT

An ear plug includes an elongated body sized and shaped to be partially inserted into an ear canal of a wearer, in which the body includes a negative Poisson's ratio (NPR) polymer foam material having a Poisson's ratio of between 0 and −1. A mouth guard includes an arc-shaped element sized to be received into a mouth of a wearer. The arc-shaped element has an outer wall, an inner wall, and a biting wall connecting the outer wall and the inner wall. The outer wall, the inner wall, and the biting wall define a channel that is sized to receive upper teeth of the wearer or lower teeth of the wearer. The outer wall, the biting wall, or both includes a negative Poisson's ratio (NPR) material having a Poisson's ratio between 0 and −1.

13 Claims, 9 Drawing Sheets

(51) Int. Cl.
    *B29K 21/00*      (2006.01)
    *B29K 105/04*     (2006.01)
    *B33Y 10/00*      (2015.01)
    *B33Y 70/00*      (2020.01)
    *B33Y 80/00*      (2015.01)
    *C08L 21/00*      (2006.01)

(56) References Cited

FOREIGN PATENT DOCUMENTS

| WO | WO 2013/101405 | | 7/2013 | | |
| WO | WO-2013101405 A2 | * | 7/2013 | ............ | C08J 9/0061 |
| WO | WO 2015/109359 | | 7/2015 | | |
| WO | WO-2015109359 A1 | * | 7/2015 | ........... | B29C 44/357 |
| WO | WO 2019/237025 | | 12/2019 | | |
| WO | WO-2019237025 A1 | * | 12/2019 | ............ | A42B 3/064 |
| WO | WO 2020/150737 | | 7/2020 | | |
| WO | WO-2020150737 A1 | * | 7/2020 | ............ | A61M 21/02 |

OTHER PUBLICATIONS

JP 2009537359 A machine translation (Year: 2007).*
Lakes, Roderick: "Foam Structures With a Negative Poisson's Ratio" (Science, vol. 235, pp. 1038-1040, 1987) (Year: 1987).*
International Preliminary Report on Patentability in International Appln. No. PCT/US2022/031028, mailed on Dec. 7, 2023, 10 pages.
Invitation to Pay Additional Fees And, Where Applicable, Protest Fee in International Appln. No. PCT/US2022/031028, mailed Jul. 21, 2022, 2 pages.
Jacobson et al., "Effectiveness of the V-51R Ear Plug With Impulse Pressures Up To 8 psi," Defense Technical Information Center, Nov. 1962, 59 pages.
Samuelli et al., "The Study of Attenuation Levels and the Comfort of Earplugs," Noise & Health, May 2018, 20(94):112-119.
Buhr-Lawler, "A Hearing Loss Prevention Outreach Program for Farmers and Motorsports Enthusiasts," Seminars in Hearing, 2017, 38(02):212-222.
Cha et al., "Increase in use of protective earplugs by Rock and Roll concert attendees when provided for free at concert venues," International Journal of Audiology, Nov. 2015, 54(12):984-986.
Hagerman, "Musicians' ability to judge the risk of acquiring noise induced hearing loss," Noise & Health, 2013, 15(64):199-203.
Friis et al., "Negative Poisson's ratio polymeric and metallic foams," Journal of Materials Science, Dec. 1988, 23:4406-4414.
International Search Report and Written Opinion in International Appln. No. PCT/US22/31028, dated Oct. 6, 2022, 13 pages.

* cited by examiner

NEGATIVE POISSON'S RATIO MATERIALS FOR EAR PLUGS AND MOUTH GUARDS

BACKGROUND

The present disclosure relates generally to materials for objects such as ear plugs, ear muffs, mouth guards, and floor mats.

SUMMARY

We describe here objects, such as ear plugs, ear muffs, mouth guards, and floor mats, that include materials having a negative Poisson's ratio ("NPR materials"). NPR materials are durable and capable of attenuating or absorbing energy, such as sound waves or energy from impact. NPR materials in ear plugs or ear muffs attenuate sound waves, thereby reducing the magnitude of the sound that reaches the wearer's eardrum. NPR materials in mouth guards absorb energy from impacts, e.g., from tooth grinding or from impact by an external object, such as a sports ball, thereby helping to protect the wearer's teeth and jaw. NPR materials have a lower density than PPR materials, e.g., than PPR materials of a similar composition or than PPR materials having similar mechanical properties, and ear plugs, ear muffs, and mouth guards including NPR materials can thus be lighter in weight than similar objects formed of PPR materials. Objects such as ear plugs, ear muffs, mouth guards, or floor mats can be formed of NPR materials alone or in conjunction with materials having a positive Poisson's ratio ("PPR materials"). In some examples, some elements can be formed of NPR materials and other elements of PPR materials. In some examples, composite materials that include both NPR materials and PPR materials are used.

In an aspect, an ear plug includes an elongated body sized and shaped to be partially inserted into an ear canal of a wearer, in which the body includes a negative Poisson's ratio (NPR) polymer foam material having a Poisson's ratio of between 0 and −1.

Embodiments can include one or any combination of two or more of the following features.

The elongated body is a generally cylindrical body having an increasing diameter from a first end to a second end, the first end being configured to be inserted into the ear canal of the wearer.

The elongated body includes an elongated stem, and a flange disposed at a first end of the elongated stem. The flange includes the NPR polymer foam material.

The NPR polymer foam material includes an NPR rubber foam. The NPR rubber foam includes one or more of butadiene, polybutadiene, or styrene-butadiene.

The NPR polymer foam material includes a thermoplastic polymer NPR foam or a viscoelastic elastomer NPR foam.

The NPR polymer foam material has a Poisson's ratio of between 0 and −0.8.

The NPR polymer foam material is composed of a cellular structure having a characteristic dimension of between 0.1 μm and 3 mm.

The body includes a composite material including the NPR polymer foam material and a positive Poisson's ratio (PPR) material.

The ear plug includes an outer layer surrounding at least a portion of the body. The outer layer includes a PPR material.

The outer layer includes a material having a lower coefficient of friction with respect to the ear canal of the wearer than the NPR polymer foam material. The outer layer includes a polymer.

In an aspect, a method of making an ear plug includes forming an elongated body from an NPR polymer foam material having a Poisson's ratio of between 0 and −1, including forming the body in a size to be partially inserted into an ear canal of a wearer.

Embodiments can include one or any combination of two or more of the following features.

Forming the body includes heating and compressing a PPR polymer foam material to form the NPR polymer foam material.

Forming the body includes forming the body from nano- or micro-structured PPR materials.

Forming the body includes forming the body using an additive manufacturing technique.

Forming the body includes forming an inner layer from the NPR polymer foam material and forming an outer layer surrounding at least a portion of the inner layer. Forming the outer layer includes coating the at least portion of the inner layer with a polymer.

Forming the body includes forming a generally cylindrical body having an increasing diameter from a first end to a second end, the first end being configured to be inserted into the ear canal of the wearer.

Forming the body includes forming an elongated stem and a flange disposed at a first end of the elongated stem. The method includes forming the flange from the NPR polymer foam material.

In an aspect, an ear muff includes an arced headband; and a protector disposed at an end of the arced headband. The protector includes a cushion sized to fit around at least a portion of an ear of a wearer. The cushion includes an NPR polymer foam material having a Poisson's ratio of between 0 and −1.

Embodiments can include one or any combination of two or more of the following features.

The protector includes a cover disposed over at least a portion of the cushion. The cover is formed of a material having a higher elastic modulus than the elastic modulus of the NPR polymer foam material of the cushion.

The arced headband is includes an NPR material. The arced headband is formed of an NPR-PPR composite material. The elastic modulus of the NPR material of the arced headband is higher than the elastic modulus of the NPR polymer foam material of the cushion.

In an aspect, a mouth guard includes an arc-shaped element sized to be received into a mouth of a wearer. The arc-shaped element has an outer wall, an inner wall, and a biting wall connecting the outer wall and the inner wall. The outer wall, the inner wall, and the biting wall define a channel that is sized to receive upper teeth of the wearer or lower teeth of the wearer. The outer wall, the biting wall, or both includes a negative Poisson's ratio (NPR) material having a Poisson's ratio between 0 and −1.

Embodiments can include one or any combination of two or more of the following features.

The outer wall, the biting wall, or both includes a composite material including the NPR material and a positive Poisson's ratio (PPR) material. The composite material includes a layered composite material. The composite material includes a fiber-based composite material including fibers of the PPR material in a matrix of the NPR material.

The NPR material includes an NPR foam material. The NPR foam material includes an NPR polymer foam. The NPR polymer foam includes an NPR rubber foam. The NPR rubber foam includes one or more of butadiene, polybutadiene, or styrene-butadiene. The NPR polymer foam includes one or more of a thermoplastic polymer NPR foam or a viscoelastic elastomer NPR foam. The NPR foam material is composed of a cellular structure having a characteristic dimension of between 0.1 μm and 3 mm.

The biting wall includes an interior layer disposed between a top surface layer and a bottom surface layer, and in which the interior layer is formed of the NPR material.

The top surface layer and the bottom surface layer are formed of a polymer material different from the NPR material.

The top surface layer and the bottom surface layer are formed of a thermoplastic polymer or a thermoset plastic.

The top surface layer and the bottom surface layer are formed of an antibacterial material.

The outer wall includes a middle layer disposed between an interior surface layer and exterior surface layer, and in which the interior surface layer is formed of the NPR material. The interior surface layer and the exterior surface layer are formed of a polymer material different from the NPR material. The interior surface layer and the exterior surface layer are formed of a thermoplastic polymer or a thermoset plastic.

The interior surface layer and the exterior surface layer are formed of an antibacterial material.

The channel defines indentations configured to receive the upper teeth or the lower teeth of the wearer. The indentations are sized to accommodate a motion of the upper teeth or the lower teeth arising from an orthodontic intervention.

In an aspect, a method of making a mouth guard includes forming an arc-shaped element such that an outer wall, an inner wall, and a biting wall connecting the outer wall and the inner wall define a channel that is sized to receive upper teeth of the wearer or lower teeth of a wearer. Forming the arc-shaped element includes forming the outer wall, the biting wall, or both to include an NPR material having a Poisson's ratio of between 0 and −1.

Embodiments can include one or any combination of two or more of the following features.

Forming the outer wall, the biting wall, or both from a composite material including the NPR material and a positive Poisson's ratio (PPR) material.

The method includes forming the outer wall, the biting wall, or both from an NPR foam material. The method includes forming the outer wall, the biting wall, or both from an NPR polymer foam.

Forming the arc-shaped element includes forming the biting wall, and in which forming the biting wall includes forming an interior layer disposed between a top surface layer and a bottom surface layer, including forming the interior layer of the NPR material.

Forming the arc-shaped element includes forming the outer wall, and in which forming the outer wall includes forming middle layer disposed between an interior surface layer and an exterior surface layer, including forming the interior surface layer of the NPR material.

Forming the arc-shaped element includes forming indentations in the channel, the indentations configured to receive the upper teeth or the lower teeth of the wearer.

Forming the arc-shaped element includes forming the arc-shaped element according to an orthodontic mold of the wearer.

Forming the arc-shaped element includes heating and compressing a PPR material to form the NPR material.

Forming the arc-shaped element includes forming the arc-shaped element from nano- or micro-structured PPR materials.

Forming the arc-shaped element includes forming the arc-shaped element using an additive manufacturing technique.

Other implementations are within the scope of the claims.

DETAILED DESCRIPTION

We describe here objects, such as ear plugs, ear muffs, mouth guards, and floor mats, that include materials having a negative Poisson's ratio ("NPR materials"). NPR materials are durable and capable of attenuating or absorbing energy, such as sound waves or energy from impact. NPR materials in ear plugs or ear muffs attenuate sound waves, thereby reducing the magnitude of the sound that reaches the wearer's eardrum. NPR materials in mouth guards absorb energy from impacts, e.g., from tooth grinding or from impact by an external object, such as a sports ball, thereby helping to protect the wearer's teeth and jaw. NPR materials have a lower density than PPR materials, e.g., than PPR materials of a similar composition or than PPR materials having similar mechanical properties, and ear plugs, ear muffs, and mouth guards including NPR materials can thus be lighter in weight than similar objects formed of PPR materials. Objects such as ear plugs, ear muffs, mouth guards, or floor mats can be formed of NPR materials alone or in conjunction with materials having a positive Poisson's ratio ("PPR materials"). In some examples, some elements can be formed of NPR materials and other elements of PPR materials. In some examples, composite materials that include both NPR materials and PPR materials are used.

Figure 1:
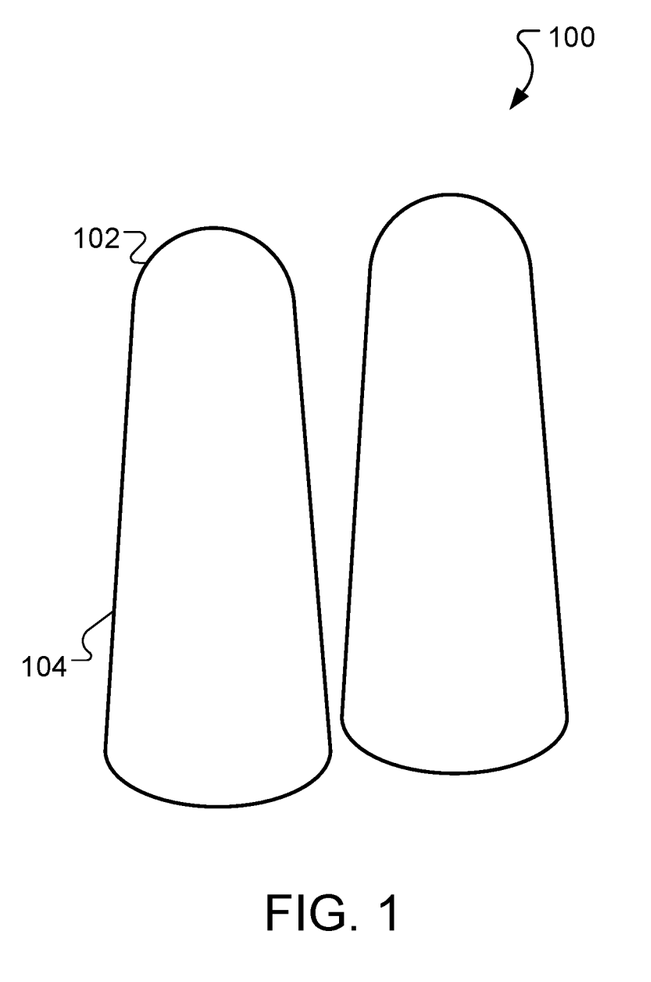
FIG. 1 is an illustration of ear plugs.

Referring to FIG. 1, a set of ear plugs 100 is illustrated. The ear plugs 100 have an elongated body that is sized and shaped to be partially inserted into an ear canal of a wearer. For instance, the elongated body of the ear plugs 100 can be generally cylindrical, e.g., with a slightly increasing diameter from a proximal end 102 to a distal end 104. The ear plugs 100 can have a diameter of about 9 millimeters (mm) to about 15 mm. For instance, an average adult ear canal is about 9 millimeters in diameter, and the ear plugs 100 can have a diameter slightly larger than 9 mm to completely fill the ear canal. The ear plugs 100 can have a range of lengths as appropriate to be at least partially inserted into the ear canal of a wearer (e.g., 10 millimeters, 15 millimeters, 20 millimeters, 45 millimeters, etc.). Although the ear plugs are illustrated in a generally cylindrical shape, the ear plugs can be a variety of shapes that fill the ear canal (e.g., hexagonal, octagonal, elliptical, etc.).

In some examples, ear plugs are formed of a malleable foam or sponge material that can absorb sound waves, such as elastomers such as polyvinyl chloride, polyurethane other elastomers, or other suitable materials. To use such ear plugs, a user compresses or rolls the ear plugs into a thin shape, e.g., a generally cylindrical shape, and inserts the rolled or compressed ear plugs into his or her ear canal. Once in the ear canal, the ear plugs expand back into their original shape and fill a portion of the interior of the user's the ear canal.

In some examples, ear plugs are formed of a moldable material, such as a wax, silicone putty, or other suitable material. To use such ear plugs, a user molds the ear plugs over a portion of the ear canal, e.g., over an exterior portion of the ear canal.

In some examples, ear plugs are a generic design suitable for a variety of users, e.g., for any adult. In some examples, ear plugs are custom designed to specifically fit into a particular user's ears. For example, a mold of a user's ear can be used to fabricate a molded ear plug that is sized and shaped for that user's ear, e.g., for an interior portion of the user's ear canal. In one implementation, a mold of the exterior of a user's ear canal can be used to custom design and create an ear plug that is unique to exterior of that user's ear canal.

The ear plugs 100 described here are formed of an NPR material (also referred to as an auxetic material). In some examples, the ear plugs 100 are formed of a composite material that include both NPR materials and PPR materials, referred to as an NPR-PPR composite material.

An NPR material is a material that has a Poisson's ratio that is less than zero, such that when the material experiences a positive strain along one axis (e.g., when the material is stretched), the strain in the material along the two perpendicular axes is also positive (e.g., the material expands in cross-section). Conversely, when the material experiences a negative strain along one axis (e.g., when the material is compressed), the strain in the material along a perpendicular axis is also negative (e.g., the material compresses along the perpendicular axis). By contrast, a PPR material has a Poisson's ratio that is greater than zero. When a PPR material experiences a positive strain along one axis (e.g., when the material is stretched), the strain in the material along the two perpendicular axes is negative (e.g., the material compresses in cross-section), and vice versa.

Figure 2:
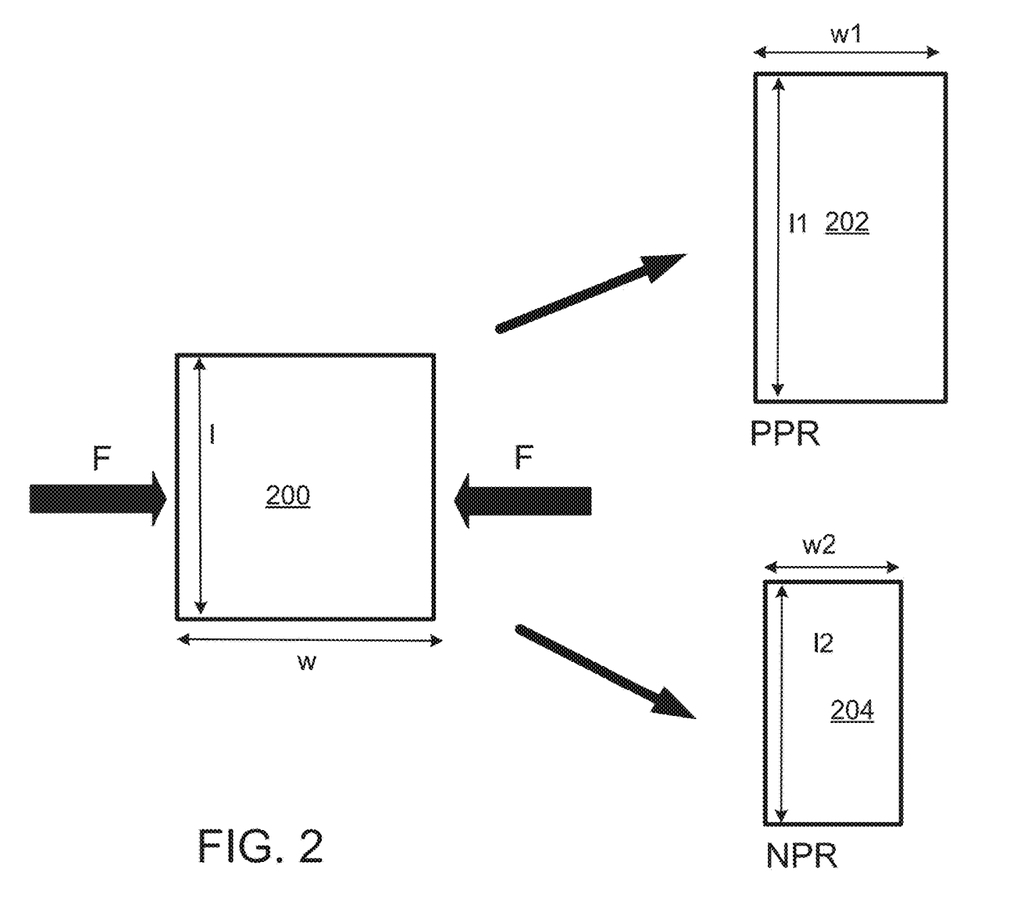
FIG. 2 is an illustration of materials with negative and positive Poisson's ratios

Materials with negative and positive Poisson's ratios are illustrated in FIG. 2, which depicts a hypothetical two-dimensional block of material 200 with length l and width w.

If the hypothetical block of material 200 is a PPR material, when the block of material 200 is compressed along its width w, the material deforms into the shape shown as block 202. The width w1 of block 202 is less than the width w of block 200, and the length l1 of block 202 is greater than the length l of block 200: the material compresses along its width and expands along its length.

By contrast, if the hypothetical block of material 200 is an NPR material, when the block of material 200 is compressed along its width w, the material deforms into the shape shown as block 204. Both the width w2 and the length l2 of block 204 are less than the width w and length l, respectively, of block 200: the material compresses along both its width and its length.

NPR materials for ear plugs can be foams, such as polymeric foams, ceramic foams, metallic foams, or combinations thereof. A foam is a multi-phase composite material in which one phase is gaseous and the one or more other phases are solid (e.g., polymeric, ceramic, or metallic). Foams can be closed-cell foams, in which each gaseous cell is sealed by solid material; open-cell foams, in which the each cell communicates with the outside atmosphere; or mixed, in which some cells are closed and some cells are open.

An example of an NPR foam structure is a re-entrant structure, which is a foam in which the walls of the cells are concave, e.g., protruding inwards toward the interior of the cells. In a re-entrant foam, compression applied to opposing walls of a cell will cause the four other, inwardly directed walls of the cell to buckle inward further, causing the material in cross-section to compress, such that a compression occurs in all directions. Similarly, tension applied to opposing walls of a cell will cause the four other, inwardly directed walls of the cell to unfold, causing the material in cross-section to expand, such that expansion occurs in all directions. NPR foams can have a Poisson's ratio of between $-1$ and 0, e.g., between $-0.8$ and 0, e.g., $-0.8$, $-0.7$, $-0.6$, $-0.5$, $-0.4$, $-0.3$, $-0.2$, or $-0.1$. NPR foams can have an isotropic Poisson's ratio (e.g., Poisson's ratio is the same in all directions) or an anisotropic Poisson's ratio (e.g., Poisson's ratio when the foam is strained in one direction differs from Poisson's ratio when the foam is strained in a different direction).

An NPR foam can be polydisperse (e.g., the cells of the foam are not all of the same size) and disordered (e.g., the cells of the foam are randomly arranged, as opposed to being arranged in a regular lattice). An NPR foam can have a characteristic dimension (e.g., the size of a representative cell, such as the width of the cell from one wall to the opposing wall) ranging from 0.1 µm to about 3 mm, e.g., about 0.1 µm, about 0.5 µm, about 1 µm, about 10 µm, about 50 µm, about 100 µm, about 900 µm, about 1 mm, about 2 mm, or about 3 mm.

Examples of polymeric foams for ear plugs include thermoplastic polymer foams (e.g., polyester polyurethane or polyether polyurethane); viscoelastic elastomer foams; or thermosetting polymer foams such as silicone rubber. Examples of metallic foams include metallic foams based on copper, aluminum, or other metals, or alloys thereof NPR-PPR composite materials are composites that include both regions of NPR material and regions of PPR material. NPR-PPR composite materials can be laminar composites, matrix composites (e.g., metal matrix composites, polymer matrix composites, or ceramic matrix composites), particulate reinforced composites, fiber reinforced composites, or other types of composite materials. In some examples, the NPR material is the matrix phase of the composite and the PPR material is the reinforcement phase, e.g., the particulate phase or fiber phase. In some examples, the PPR material is the matrix phase of the composite and the NPR material is the reinforcement phase.

Figure 3:
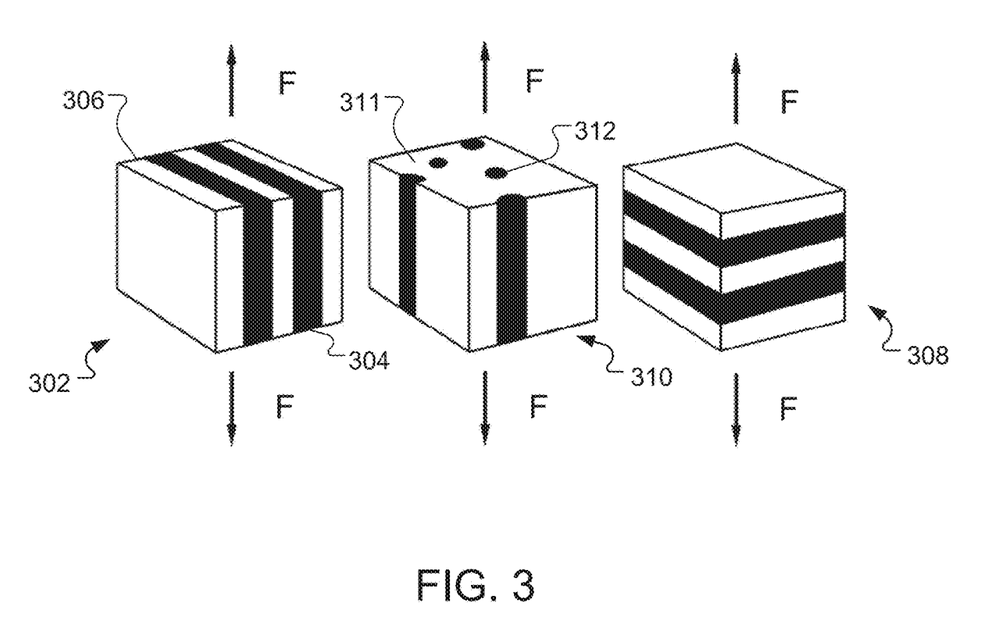
FIG. 3 is an illustration of composite materials.

FIG. 3 illustrates examples of NPR-PPR composite materials. An NPR-PPR composite material 302 is a laminar composite including alternating layers 304 of NPR material and layers 306 of PPR material. The layers 304, 306 are arranged in parallel to a force to be exerted on the composite material 302. Although the layers 304, 306 are shown as having equal width, in some examples, a laminar composite can have layers of different widths.

An NPR-PPR composite material 308 is a laminar composite including alternating layers of NPR material and PPR material, with the layers arranged perpendicular to a force to be exerted on the material 308. In some examples, the layers of a laminar composite are arranged at an angle to the expected force that is neither perpendicular nor parallel.

An NPR-PPR composite material 312 is a matrix composite including a matrix phase 311 of NPR material with a reinforcement phase 312 of PPR material. In the material 312, the reinforcement phase 312 includes fibers of the PPR material; in some examples, the reinforcement phase 312 can include particles or other configuration. In some examples, NPR-PPR composite materials can have a matrix phase of a PPR material with a reinforcement phase of an NPR material.

Figure 4:
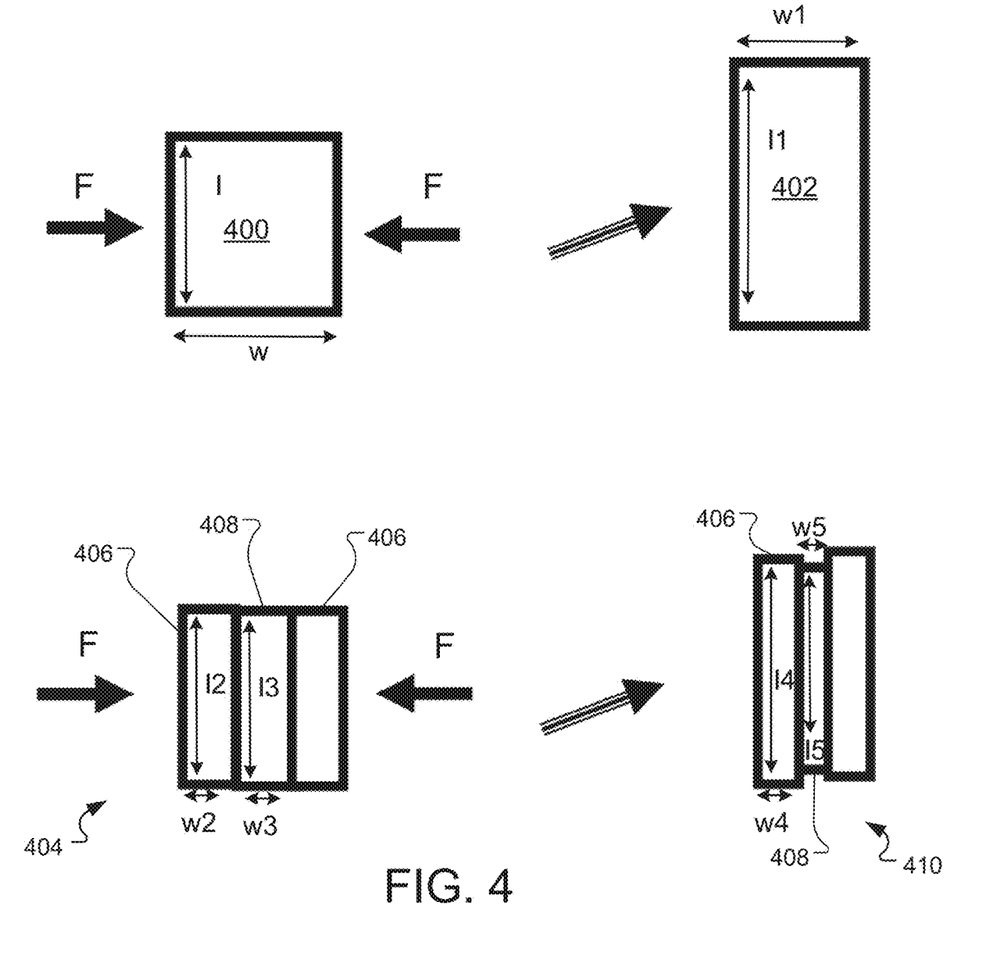
FIG. 4 is an illustration of a material with a positive Poisson's ratio and a composite material.

FIG. 4 illustrates the mechanical behavior of PPR and NPR/PPR composite materials. A hypothetical block 400 of PPR material, when compressed along its width w, deforms into a shape 402. The width w1 of the compressed block 402 is less than the width w of the uncompressed block 400, and the length l1 of the compressed block 402 is greater than the length l of the uncompressed block: the material compresses along the axis to which the compressive force is applied and expands along a perpendicular axis.

A block 404 of NPR/PPR composite material includes a region 408 of NPR material sandwiched between two regions 406 of PPR material. When the block 404 of composite material is compressed along its width, the material deforms into a shape 410. The PPR regions 406 compress along the axis of compression and expand along a perpendicular axis, e.g., as described above for the block 400 of PPR material, such that, e.g., the width w2 of a region 406 of uncompressed PPR material compresses to a smaller width w4 and the length l2 of the region 406 expands to a greater length l4. In contrast, the NPR region 408 compresses along both the axis of compression and along the perpendicular axis, such that, e.g., both the width w3 and length l3 of the uncompressed NPR region 408 are greater than the width w5 and length l5 of the compressed NPR region 408.

Figure 5:
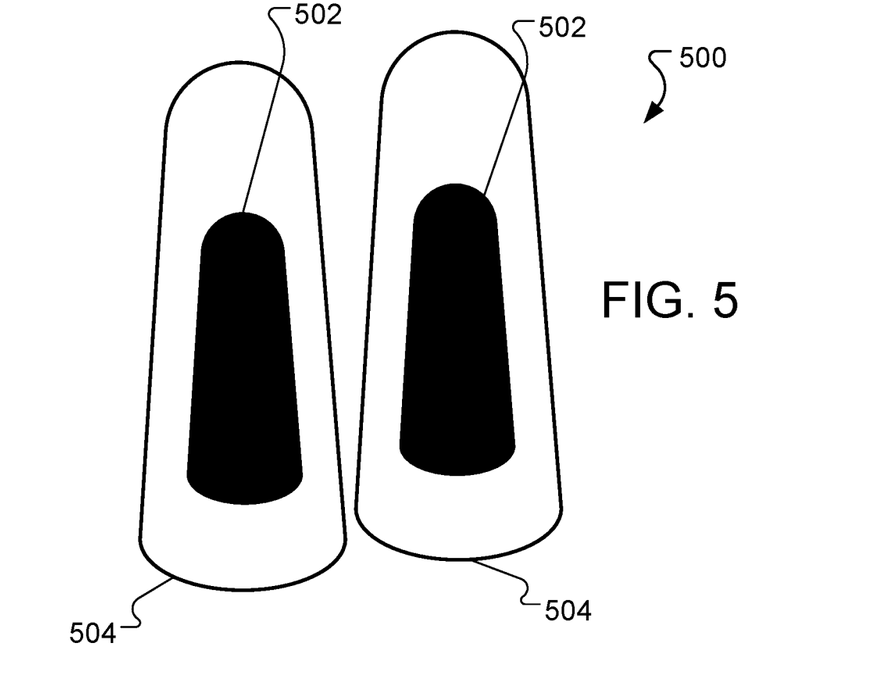
FIG. 5 is an illustration of multilayer ear plugs.

With reference to FIG. 5, ear plugs 500 have an inner layer 502 and an outer layer 504. The inner layer 502 can have a diameter of, e.g., about 0.01 millimeters to about 14.9 millimeters, and the outer layer 504 can have a thickness of, e.g., about 0.01 millimeters to about 14.9 millimeters.

The inner layer 502 and the outer layer 504 can be formed of different materials. The different composition of the inner layer 502 and outer layer 504 can, e.g., allow for a desired acoustic dampening behavior or provide a comfortable or sanitary experience to a wearer, etc. In some examples, the outer layer 210 can act as a barrier layer to prevent contact between the user and the inner layer 502. In some examples, the outer layer 210 makes the ear plugs comfortable for the user, e.g., the outer layer can be formed of a low friction material (e.g., the outer layer has a lower coefficient of friction than the inner layer with respect to the user's ear canal), a softer material that conforms better to a wearer's ear canal than the material of the inner layer, or a moldable material. In an example, the inner layer 502 is formed of an NPR material, such as an NPR polymer foam material, or an NPR-PPR composite material; and the outer layer is formed of a PPR material, such as a polymer, e.g., polyurethane, silicone, or another suitable material; or vice versa.

In some examples, ear plugs have more than two layers (e.g., 3 layers, 4 layers, etc.). In implementations with more than two layers, each layer can be formed of a different material, or multiple layers can be formed of the same material.

Figure 6:
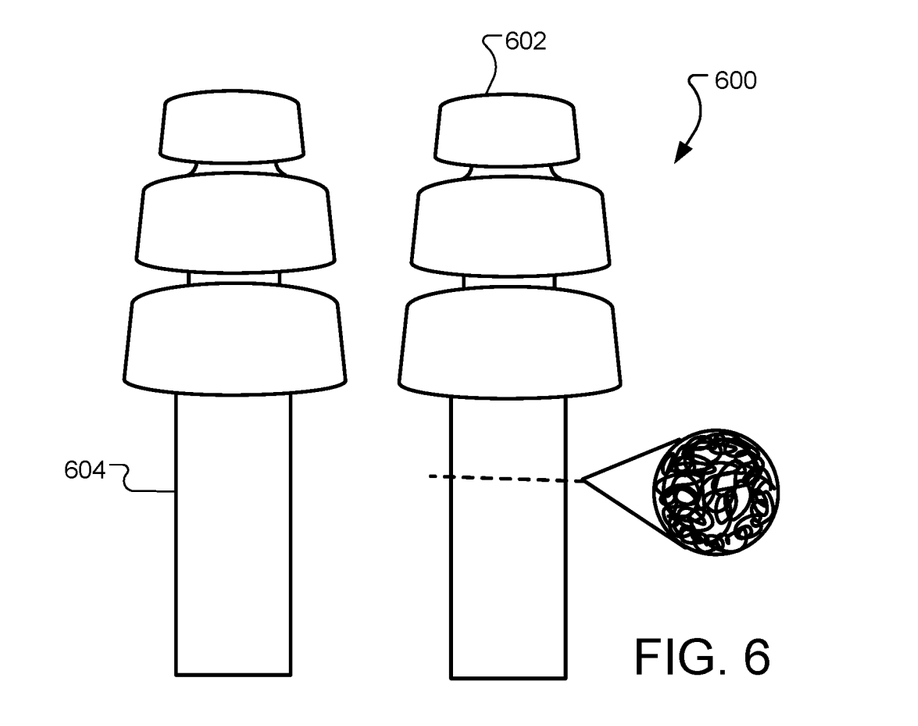
FIG. 6 is an illustration of ear plugs.

FIG. 6 is an illustration of a set of flanged ear plugs 600. The flanged ear plugs 1000 each include an elongated body having flanges 602 along a central stem 604. The flanges 602 are sized and shaped to be inserted into an ear canal of a wearer. For instance, for ear plugs targeted to be worn by adults, the flanges 602 can have a diameter of about 9 millimeters to about 15 millimeters. The flanges 602 of the ear plugs 1000 have different diameters, with the diameter decreasing toward a proximal end of the elongated body. In some examples, some or all of the flanges 602 have substantially the same diameter. The stem 604 has a smaller diameter than the flanges 602.

In the illustrated example, the stem 604 is generally cylindrical and the flanges 602 are generally hemispherical. In some implementations, the flanges 602 and stem 604 are other shapes, such as elliptical, hexagonal, octagonal, etc. The flanges 602 can all be the same shape, or one or more of the flanges can be a different shape from one or more other flanges.

To use the flanged ear plugs 1000, a user inserts the flanged ear plugs 1000 into his or her ear canal, leading with the flanged end of the ear plugs 1000. Upon insertion, the flanges 602 of the flanged ear plugs 1000 fit tightly against the interior of the ear canal, thereby attenuating sound waves in the ear canal and reducing the sound that travels through the ear canal to the wearer's eardrum. The stem 604 acts as a handle by which the wearer can manipulate the ear plugs 1000, e.g., to insert the flanged ear plugs 1000 into the ear canal and to remove the flanged ear plugs 1000 from the ear canal.

The flanges 602, stem 604, or both are formed of an NPR material, such as an NPR polymer foam material, or an NPR-PPR composite material. In some implementations, the flanges 602 and the stem 604 are formed of the same material. In other implementations, the flanges 602 and the stem 604 are formed of different materials. For instance, the flanges 602 can be formed of a material that is more flexible (e.g., compliant) than the material of the stem 604 to facilitate insertion of the ear plugs 1000 into the ear canal and to provide a robust structure to grip the ear plugs for removal. In an example, the flanges 602 are formed of an NPR material, such as an NPR polymer foam material, or an NPR-PPR composite material, and the stem 604 is formed of a PPR material, such as a polymer, e.g., polyurethane, silicone, or another suitable material.

In some examples, flanged ear plugs are a generic design suitable for a variety of users, e.g., for any adult. In some examples, flanged ear plugs are custom designed to specifically fit into a particular user's ears. For example, a mold of a user's ear can be used to fabricate a molded ear plug that is sized and shaped for that user's ear, e.g., for an interior portion of the user's ear canal. In one implementation, a mold of the exterior of a user's ear canal can be used to custom design and create a flanged ear plug that is unique to exterior of that user's ear canal.

In some examples, the flanged ear plugs 1000 can have multiple layers (e.g., an inner layer and an outer layer, or more than two layers). The stem 604, the flanges 602, or both can be multi-layer structures. One or more of the layers can be formed of an NPR material or an NPR-PPR composite material.

In some examples, NPR foams are produced by transformation of PPR foams to change the structure of the foam into a structure that exhibits a negative Poisson's ratio. In some examples, NPR foams are produced by transformation of nanostructured or microstructured PPR materials, such as nanospheres, microspheres, nanotubes, microtubes, or other nano- or micro-structured materials, into a foam structure that exhibits a negative Poisson's ratio. The transformation of a PPR foam or a nanostructured or microstructured material into an NPR foam can involve thermal treatment (e.g., heating, cooling, or both), application of pressure, or a combination thereof. In some examples, PPR materials, such as PPR foams or nanostructured or microstructured PPR materials, are transformed into NPR materials by chemical processes, e.g., by using glue. In some examples, NPR materials are fabricated using micromachining or lithographic techniques, e.g., by laser micromachining or lithographic patterning of thin layers of material. In some examples, NPR materials are fabricated by additive manufacturing (e.g., three-dimensional (3D) printing) techniques, such as stereolithography, selective laser sintering, or other appropriate additive manufacturing technique.

In an example, a PPR thermoplastic foam, such as an elastomeric silicone film, can be transformed into an NPR foam by compressing the PPR foam, heating the compressed foam to a temperature above its softening point, and cooling the compressed foam. In an example, a PPR foam composed of a ductile metal can be transformed into an NPR foam by uniaxially compressing the PPR foam until the foam yields, followed by uniaxially compression in other directions.

Figure 7:
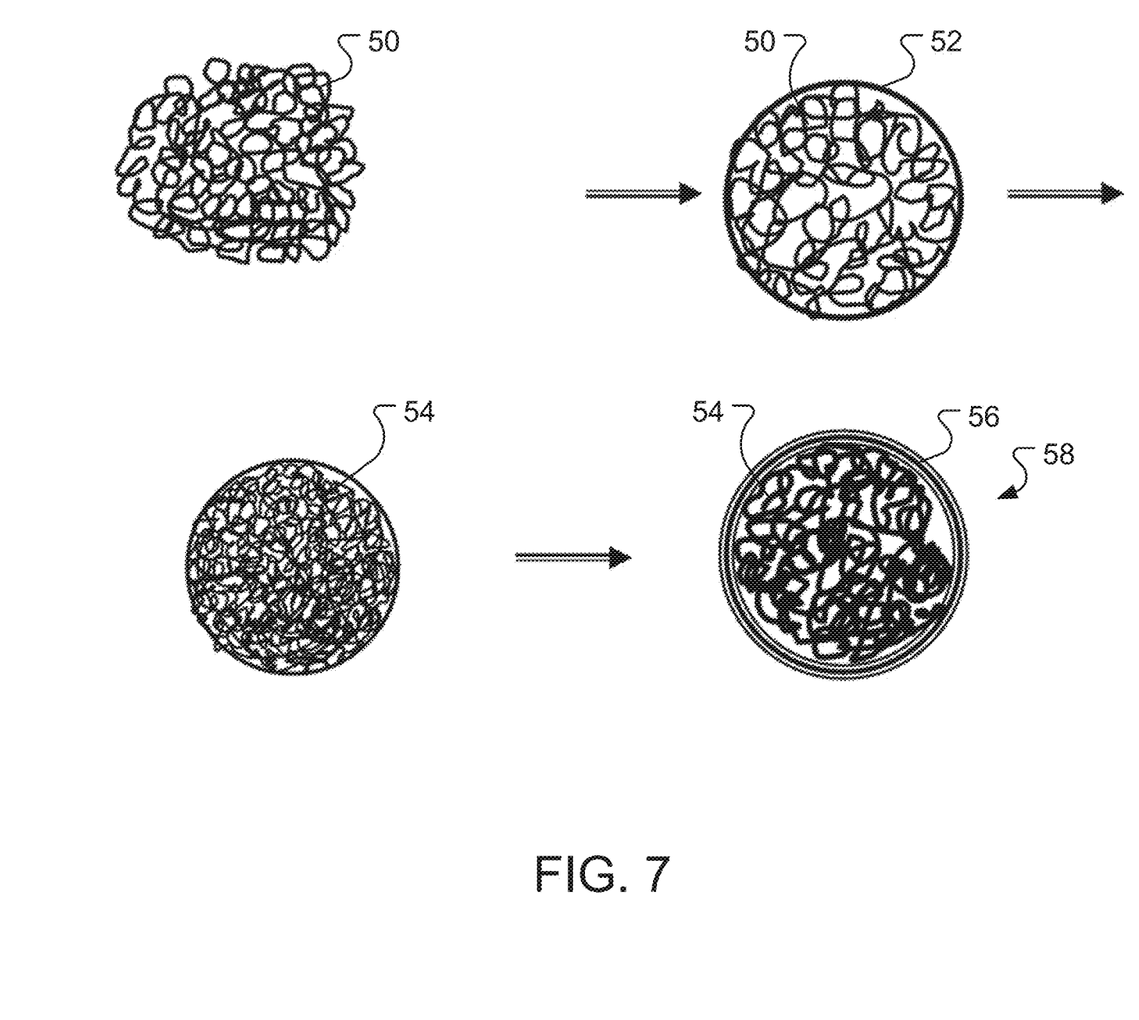
FIG. 7 is an illustration of a method of making an ear plug.

FIG. 7 illustrates an example method of making a multi-layer ear plug in which an inner layer is formed of an NPR material. A granular or powdered material, such as a polymer material (e.g., a rubber) is mixed with a foaming agent to form a porous material 50. The porous material 50 is placed into a mold 52. Pressure is applied to compress the material 50 and the compressed material is heated to a temperature above its softening point. The material is then allowed to cool, resulting in an NPR foam 54. The NPR foam 54 is covered with an outer layer 56, such as a polymer layer, and heat and pressure can be applied again to cure the final material into an ear plug 58.

Other methods can also be used to fabricate an ear plug formed of an NPR material or an NPR-PPR composite material. For example, various additive manufacturing (e.g., 3D printing) techniques, such as stereolithography, selective laser sintering, or other appropriate additive manufacturing technique, can be implemented to fabricate an ear plug formed of an NPR material or an NPR-PPR composite. In some examples, different components of the ear plug are made by different techniques. For example, the inner layer may be 3D printed while the outer layer is not, or vice versa. Additive manufacturing techniques can enable seams to be eliminated.

Figure 8:
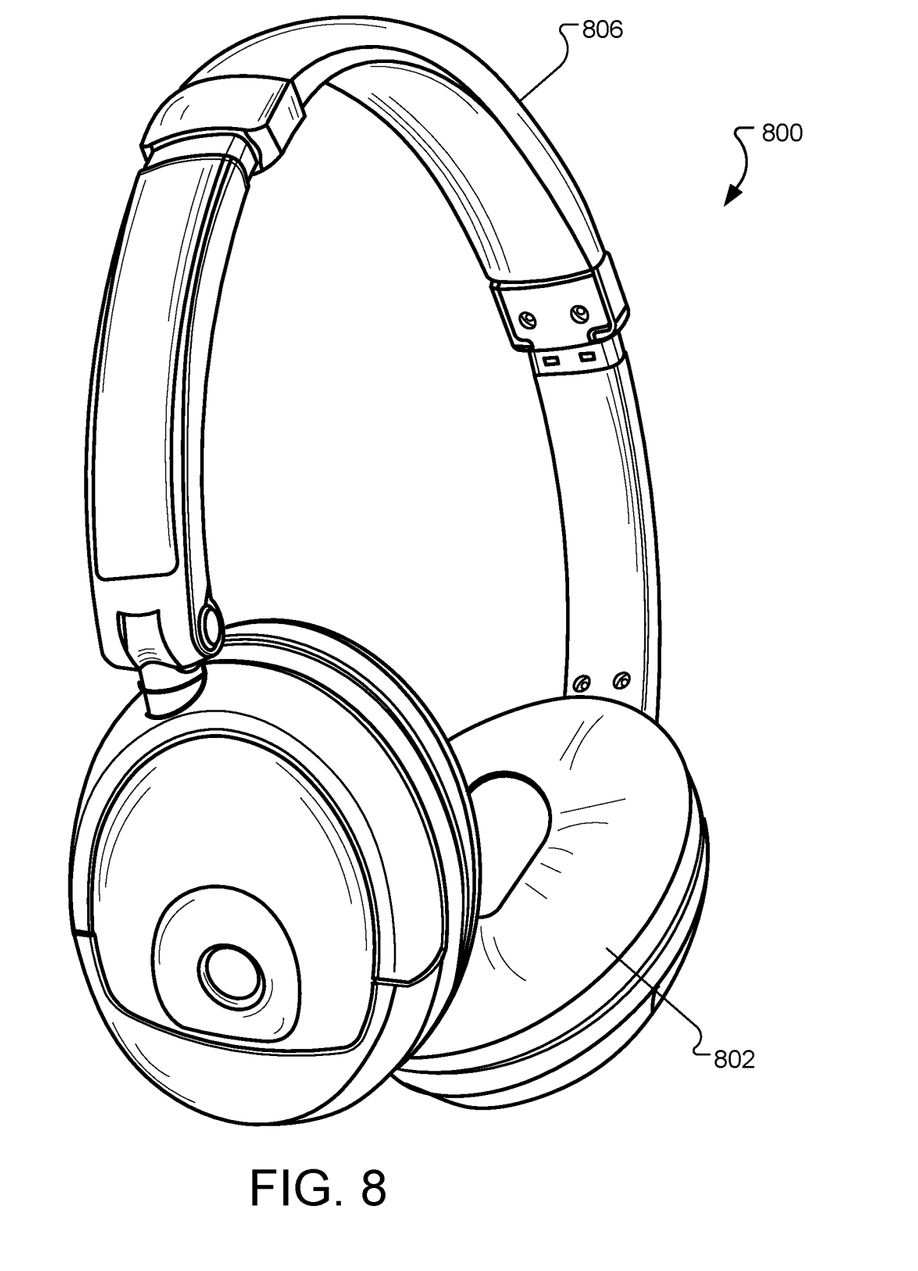
FIG. 8 is an illustration of ear muffs.

FIG. 8 is an illustration of a set of ear muffs 800. The ear muffs 800 include two protectors 804 each designed to fit around at least a portion of a respective ear of a wearer. In some implementations, the ear muffs 800 include a single protector designed to fit around at least a portion of only one ear (e.g., as in a call center headset). The protectors 804 include cushions 802 for comfort. In some examples, the cushions 802 are formed of a soft material, such as a foam, that attenuates sound, thereby reducing the volume of sound that reaches a wearer's eardrum. For instance, cushions can be formed of polyvinyl chloride, polyurethane, or other suitable materials. In some ear muffs, the cushions 802 are formed of a soft material with low or negligible sound attenuation properties, such as silk, cotton, or other suitable materials. In some examples, the cushions 802 are formed an NPR material, such as an NPR polymer foam material, or an NPR-PPR composite material. In some implementations, the protectors 804 do not include cushions.

The protectors 804 partially or fully cover the user's ears when the user wears the ear muffs 800. The protectors 804 are formed of a sound attenuating material. In some examples, the protectors 804 are formed of a PPR material, such as a PPR foam, e.g., polyvinyl chloride foam, polyurethane foam, or other suitable material. In some examples, the protectors 804 are formed of an NPR material, such as an NPR polymer foam material, or an NPR-PPR composite material. In some examples, the protectors 804 have an outer cover (not shown) that is formed of a rigid material (e.g., with a higher elastic modulus) than the foam material of the protectors 804 themselves. For instance, the protectors 804 can have a cover formed of a thermoplastic, metal, or other suitable rigid material. In some examples, the outer cover of the protectors is formed of an NPR material or an NPR-PPR material. The cover can cover all or a portion of the cushion, e.g., the cover can cover an outer portion of the cushion that faces away from a wearer when the ear muffs 800 are worn, while an inner portion of the cushion that contacts the wearer is uncovered for comfort.

The protectors 804 are connected by a headband 806, which is formed of a rigid material. In some examples, the headband 806 is formed of a PPR material, such as a thermoplastic, metal, or other suitable material. In some examples, the headband 806 is formed of an NPR material or an NPR-PPR composite material. Some headbands 806 formed of NPR materials or NPR-PPR composite materials are lighter and more flexible than comparable headbands formed of PPR materials.

NPR ear muffs can be produced through similar methods as described above, such as heating and compression of a mixture of a granular or powdered material with a foaming agent; additive manufacturing; or other methods.

Figures 9A, 9B:
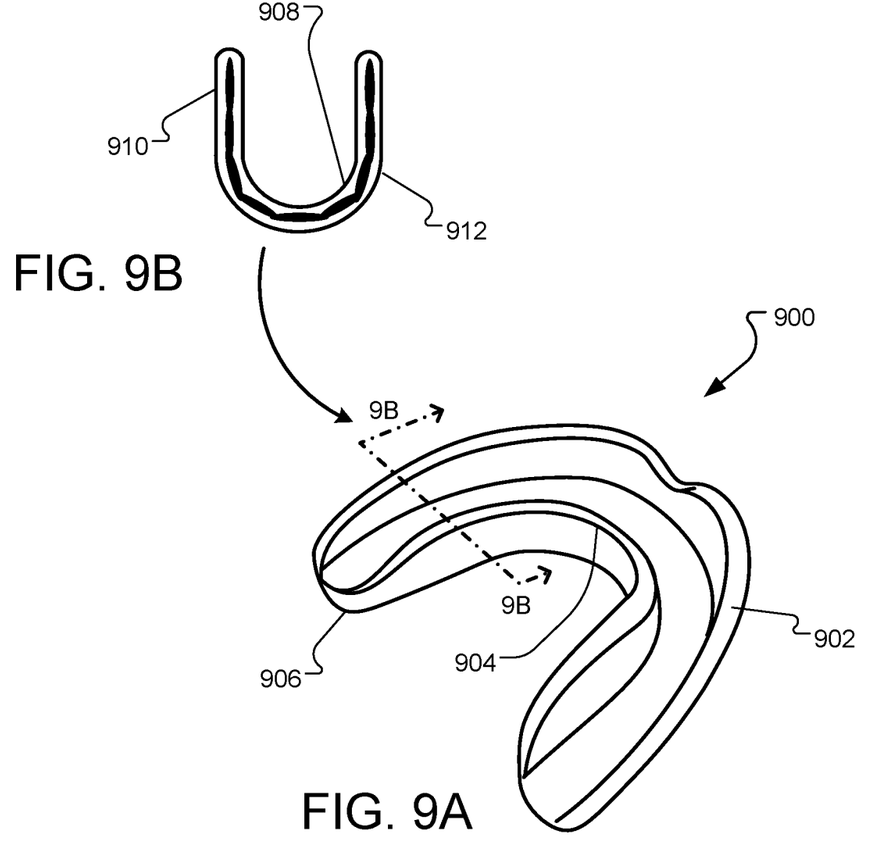
FIGS. 9A and 9B are an illustration and a cutaway illustration, respectively, of a mouth guard.

FIGS. 9A-9B are an illustration and a cutaway illustration, respectively, of a mouth guard 900. The mouth guard 900 can be generally sized and shaped (e.g., arc-shaped) to cover a user's teeth. The mouth guard 900 can be placed in the user's mouth over the top teeth, bottom teeth, or both sets of teeth, e.g., to reduce impact between the top and bottom sets of teeth or to protect the teeth from external impact. The mouth guard 900 can include an outer wall 902 that covers one side of the user's teeth (e.g., between the teeth and lips). The mouth guard can also include an inner wall 904 that covers the opposite side of the user's teeth (e.g., between the teeth and tongue). A biting wall 906 connects the outer wall 902 and the inner wall 904. The outer wall 902, inner wall 904, and biting wall 906 can define a channel 908 that is sized and shaped to receive a user's upper or lower teeth. In some examples, the channel 90 defines indentations (not shown) that are shaped and sized to receive the user's teeth. For instance, the mouth guard can be an orthodontic appliance that is designed to provide an orthodontic intervention, such as moving the teeth into a desired arrangement or maintaining an arrangement of the teeth.

Each wall (e.g., outer wall 902, inner wall 904, biting wall 906) can include multiple layers. For example, each wall can include two surface layers 910 and an interior layer 912. Different walls can also have different numbers of layers. For example, in certain implementations, one wall (e.g., biting wall 906) can include multiple layers, and the other walls (e.g., outer wall 902 and inner wall 904) include only a single layer, or vice versa.

In some implementations, the mouth guard 900 is formed of a malleable material, e.g., a thermoplastic or other appropriate malleable material. In some examples, e.g., when the mouth guard 900 is custom designed for a particular user, the mouth guard 900 is formed of less malleable materials, e.g., acrylic or other appropriate malleable material. For instance, a custom mouth guard can be formed using a mold of the user's teeth, such as an orthodontic mold. In some examples, the mouth guard 900 is formed of an NPR material, such as an NPR foam material, e.g., an NPR polymer foam material; or an NPR-PPR composite material, such as the materials described above. For instance, the mouth guard 900 can be formed of an NPR rubber foam including, e.g., butadiene, polybutadiene, or styrene-butadiene; or a thermoplastic polymer NPR foam or a viscoelastic elastomer NPR foam.

Each wall (e.g., outer wall 902, inner wall 904, biting wall 906) can be formed of the same material, or one or more of the walls can be formed of a material that differs from the material of the other walls. For example, in some implementations, the outer wall 902 and the biting wall 906 are formed of an NPR material, such as an NPR polymer foam material, or an NPR-PPR composite material, and the inner wall 904 is formed of a PPR material, such as a thermoset plastic or a thermoplastic polymer, or vice versa. In some implementations, the outer wall 902 is formed of an NPR material, such as an NPR polymer foam material, and the inner wall 904 and the biting wall 906 is formed of an NPR-PPR composite material. Additionally, different layers (e.g., surface layers 910 and interior layer 912) can be composed of different materials. For example, in some implementations, the interior layer 912 is formed of an NPR material, such as an NPR polymer foam material, or an NPR-PPR composite material, and the surface layers 910 are formed of PPR materials, or vice versa. In some examples, the surface layers 910 are formed of an antibacterial layer.

A mouth guard 900 formed of an NPR material or an NPR-PPR composite material is durable and impact resistant, and thus offers robust protection to a wearer's teeth, e.g., during contact sports, against teeth grinding, or in other situations. In addition, a mouth guard 900 formed of an NPR material or an NPR-PPR composite material is lightweight, e.g., lighter than a similarly sized mouth guard including only PPR materials, and thus can be less obtrusive to the wearer.

NPR mouth guards can be produced through similar methods as described above, such as heating and compression of a mixture of a granular or powdered material with a foaming agent; additive manufacturing; or other methods.

Figure 10:
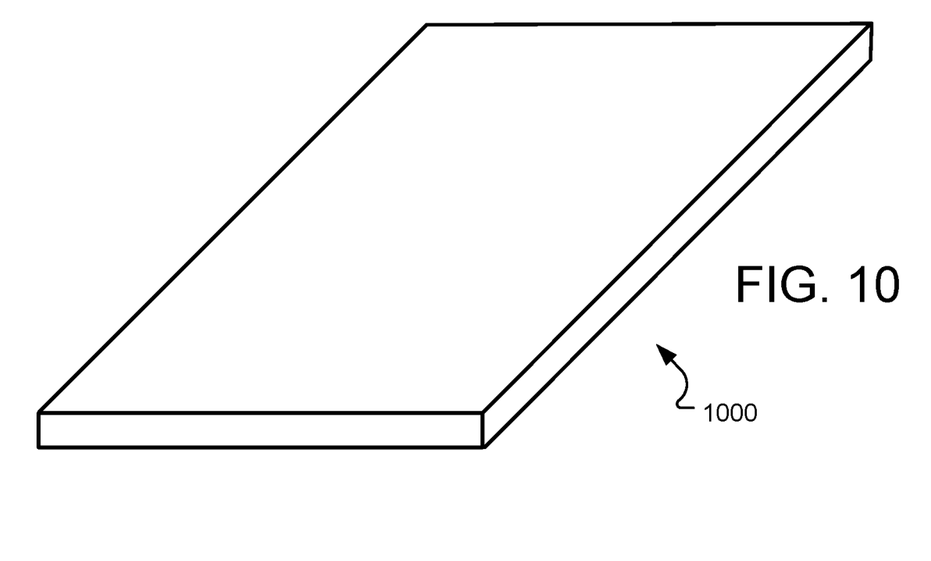
FIG. 10 is an illustration of a floor mat.

FIG. 10 is an illustration of a mat 1000. The mat can be used in a range of places, e.g., within a car, in a house, on a chair, on a floor, etc. The mat 1000 can have a size suitable for its use, e.g., one foot by one foot, four feet by six feet, ten feet by eight feet, ten feet by one foot, etc. The mat 1000 can have a thickness suitable for its use, e.g., four inches, six inches, eight inches, etc.

The mat 1000 is formed of soft materials that can reduce the force of an impact to the mat, e.g., to protect the underlying surface or to provide comfort to a person standing on the mat. Mats are formed of materials such as cork, rubber (e.g., butadiene, polybutadiene, styrene-butadiene, etc.), vinyl, or other appropriate materials. The mat 1000 is formed of an NPR material, e.g., an NPR foam material, such as an NPR polymer foam material; or an NPR-PPR composite material. The NPR composition of the mat 1000 provides durability and impact resistance, thus providing protection to an underlying surface and/or to a person standing on the mat, and extending usable lifetime of the mat.

The mat 1000 is illustrated as a rectangle. However, in other implementations, the mat 1000 could be a circle, ellipse, triangle, hexagon, or any other shape. Additionally, although the mat 1000 is illustrated as having a uniform width, the mat 1000 can have non-uniform widths.

Figure 11:
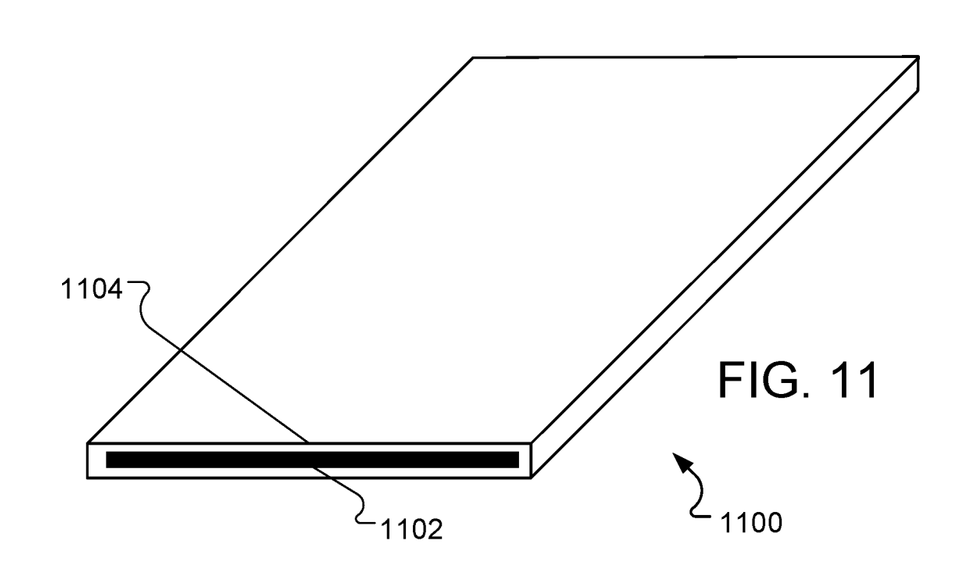
FIG. 11 is an illustration of a multilayer floor mat.

With reference to FIG. 11, a multilayer mat 1100 has an inner layer 1102 and an outer layer 1104. The inner layer 1102 and the outer layer 1104 can be composed of different materials to provide desired energy absorption (e.g., impact resistance) and durability characteristics. For example, the inner layer 1102 can be composed of an NPR material and the outer layer can be composed of a polymer, e.g., rubber, or vice versa. A harder material (e.g., more rigid) material may be used on the outer layer 1104 to protect a softer (e.g., lower modulus) material of the inner layer 1102 from, e.g., scratching, tearing, etc. The mat 1100 can also have more than two layers (e.g., 3 layers, 4 layers, etc.). In implementations with more than two layers, each layer can be composed of a different material, or multiple layers may be composed of the same material.

Particular embodiments of the subject matter have been described. Other embodiments are within the scope of the following claims.

What is claimed is:

1. An ear plug comprising:
    an elongated body sized and shaped to be partially inserted into an ear canal of a wearer, the elongated body having a largest diameter of about 9 mm to about 15 mm, the elongated body comprising:
        an inner layer comprising a polydisperse and disordered negative Poisson's ratio (NPR) polymer foam material having a Poisson's ratio of between 0 and −1, wherein the NPR polymer foam material is composed of a cellular structure having a characteristic dimension of between 0.1 μm and 3 mm, the inner layer comprising an NPR-PPR composite material, wherein the NPR-PPR composite material comprises a matrix composite including a matrix phase of the NPR polymer foam material with fibers or particles of a positive Poisson's ratio (PPR) material, and
        an outer layer at least partially surrounding the inner layer, the outer layer comprising a PPR material having a lower coefficient of friction with respect to the ear canal of the wearer than the NPR polymer foam material.

2. The ear plug of claim 1, in which the inner layer comprises alternating layers of the NPR polymer foam material and the PPR material.

3. The ear plug of claim 2, wherein the layers have different widths.

4. The ear plug of claim 2, wherein a first layer of NPR polymer foam material comprises a different polymer than a second layer of NPR polymer foam material.

5. The ear plug of claim 1, in which the elongated body comprises an elongated stem, and a flange disposed at a first end of the elongated stem.

6. The ear plug of claim 5, in which the flange comprises the NPR polymer foam material.

7. The ear plug of claim 1, in which the NPR polymer foam material comprises an NPR rubber foam.

8. The ear plug of claim 7, in which the NPR rubber foam comprises one or more of butadiene, polybutadiene, or styrene-butadiene.

9. The ear plug of claim 1, in which the elongated body is a generally cylindrical body having an increasing diameter from a first end to a second end, the first end being configured to be inserted into the ear canal of the wearer.

10. The ear plug of claim 1, in which the NPR polymer foam material comprises a thermoplastic polymer NPR foam or a viscoelastic elastomer NPR foam.

11. The ear plug of claim 1, in which NPR polymer foam material has a Poisson's ratio of between 0 and −0.8.

12. The ear plug of claim 1, in which the outer layer comprises a polymer.

13. The ear plug of claim 1, in which the NPR polymer foam material comprises an open cell foam.

* * * * *